United States Patent [19]
Shorten et al.

[11] Patent Number: 6,029,962
[45] Date of Patent: Feb. 29, 2000

[54] SHOCK ABSORBING COMPONENT AND CONSTRUCTION METHOD

[75] Inventors: Martyn R. Shorten, Portland, Oreg.; Joseph J. Skaja, San Antonio, Tex.

[73] Assignee: Retama Technology Corporation, San Antonio, Tex.

[*] Notice: This patent is subject to a terminal disclaimer.

[21] Appl. No.: 08/957,203

[22] Filed: Oct. 24, 1997

[51] Int. Cl.⁷ .................................................. F16F 1/00
[52] U.S. Cl. ................................ 267/145; 267/80; 36/29
[58] Field of Search .......................... 267/80, 136, 139, 267/140, 142, 145, 151, 152, 153, 182; 36/29, 28, 27, 35 B, 7.8; 248/633

[56] References Cited

U.S. PATENT DOCUMENTS

| | | |
|---|---|---|
| Re. 32,394 | 4/1987 | Ehrlich . |
| 957,394 | 5/1910 | Thoma . |
| 1,012,597 | 12/1911 | Church . |
| 1,539,283 | 5/1925 | Staats-Oels . |
| 2,074,331 | 3/1937 | Haider . |
| 2,090,881 | 8/1937 | Wilson . |
| 2,303,744 | 12/1942 | Jacobs . |
| 2,711,033 | 6/1955 | Dick . |
| 2,739,093 | 3/1956 | Bull . |
| 2,772,196 | 11/1956 | Pooley . |
| 2,983,056 | 5/1961 | Murawski . |
| 3,099,043 | 7/1963 | Held, Jr. . |
| 3,124,807 | 3/1964 | Frenkel et al. . |
| 3,160,963 | 12/1964 | Aaskov . |
| 3,186,013 | 6/1965 | Glassman et al. . |
| 3,327,334 | 6/1967 | Wilmanns et al. . |
| 3,538,628 | 11/1970 | Einstein, Jr. . |
| 3,608,215 | 9/1971 | Fukuoka . |
| 3,709,967 | 1/1973 | Held, Jr. . |
| 3,766,669 | 10/1973 | Pearsall . |
| 3,863,909 | 2/1975 | Weber ....................................... 267/140 |

(List continued on next page.)

FOREIGN PATENT DOCUMENTS

| | | |
|---|---|---|
| 0 530 042 A1 | 3/1993 | European Pat. Off. . |
| 2250266 | 5/1975 | France . |
| 2256735 | 8/1975 | France . |
| 539530 | 2/1956 | Italy . |
| 51-71367 | 6/1976 | Japan . |
| 2225212 | 5/1990 | United Kingdom . |
| WO 91/11928 | 8/1991 | WIPO . |
| WO 96/08812 | 3/1996 | WIPO . |
| WO 97/38237 | 10/1997 | WIPO . |

OTHER PUBLICATIONS

Belden, "Equipment update: Blow molding," *Modern Plastics*, pp. 417–420, mid–Dec., 1992.

Irwin, "Blow molding: Extrusion–blow molding," *Modern Plastics Encyclopedia*, pp. 203–210, 1988.

Kandt, "Blow Molding: Technology and applications make big strides in non–packaging sectors," *Modern Plastics*, pp. D3–D7, mid–Nov., 1994.

Phillips Petroleum Co., "Polyethylene: properties and processing," *Marlex*, TIB 1:11–12, 1992.

Phillips Petroleum Co., "Polyethylene: Blow molding trouble–shooting guide," *Marlex*, TIB 21:1–6, 1988.

Raber, "Blow molding: Extrusion–blow molding," *Modern Plastics Encyclopedia*, pp. 230–240, 1979–1980.

*Primary Examiner*—Robert J. Oberleitner
*Assistant Examiner*—Mariano Sy
*Attorney, Agent, or Firm*—Arnold White & Durkee

[57] ABSTRACT

A shock absorbing component having a pair of surfaces with a plurality of inwardly extending indentations in the top and bottom surfaces. The indentations extend between the surfaces to provide support members for the shock absorbing component. At least some of the indentations are hemispherical. The surfaces may be formed of mesh material to allow the passage of gas or fluid therethrough. One or more inserts may be placed in the indentations. The shock absorbing component can be constructed by molding upper and lower shock absorbing component halves wherein the molds are configured to provide indentations in the top and bottom surfaces. The upper and lower halves are then joined to complete the shock absorbing component.

21 Claims, 9 Drawing Sheets

U.S. PATENT DOCUMENTS

| | | |
|---|---|---|
| 3,928,881 | 12/1975 | Bente . |
| 3,952,358 | 4/1976 | Fukuoka . |
| 4,044,479 | 8/1977 | Brutting . |
| 4,106,745 | 8/1978 | Carrow . |
| 4,151,661 | 5/1979 | Namba et al. . |
| 4,170,078 | 10/1979 | Moss . |
| 4,187,620 | 2/1980 | Selner . |
| 4,223,455 | 9/1980 | Vermeulen . |
| 4,223,456 | 9/1980 | Cohen . |
| 4,236,326 | 12/1980 | Inohara . |
| 4,239,476 | 12/1980 | Somberg . |
| 4,251,932 | 2/1981 | Love . |
| 4,262,433 | 4/1981 | Hagg et al. . |
| 4,267,648 | 5/1981 | Weisz . |
| 4,288,399 | 9/1981 | Siedenstrang et al. . |
| 4,297,797 | 11/1981 | Meyers . |
| 4,299,038 | 11/1981 | Epple . |
| 4,302,892 | 12/1981 | Adamik . |
| 4,305,212 | 12/1981 | Coomer . |
| 4,342,157 | 8/1982 | Gilbert . |
| 4,342,158 | 8/1982 | McMahon et al. . |
| 4,347,637 | 9/1982 | Ardito . |
| 4,356,642 | 11/1982 | Herman . |
| 4,372,058 | 2/1983 | Stubblefield . |
| 4,377,042 | 3/1983 | Bauer . |
| 4,391,048 | 7/1983 | Lutz . |
| 4,398,357 | 8/1983 | Batra . |
| 4,400,483 | 8/1983 | Siedenstrang et al. . |
| 4,400,894 | 8/1983 | Ehrlich . |
| 4,418,483 | 12/1983 | Fujita et al. . |
| 4,423,000 | 12/1983 | Teraoka . |
| 4,428,306 | 1/1984 | Dresen et al. . |
| 4,439,936 | 4/1984 | Clarke et al. . |
| 4,445,283 | 5/1984 | Meyers . |
| 4,449,307 | 5/1984 | Stubblefield . |
| 4,455,765 | 6/1984 | Sjöswärd . |
| 4,458,430 | 7/1984 | Peterson . |
| 4,494,320 | 1/1985 | Davis . |
| 4,497,123 | 2/1985 | Ehrlich . |
| 4,510,702 | 4/1985 | Ehrlich, Jr. . |
| 4,523,393 | 6/1985 | Inohara . |
| 4,535,553 | 8/1985 | Derderian et al. . |
| 4,538,366 | 9/1985 | Norton . |
| 4,546,555 | 10/1985 | Spademan . |
| 4,553,342 | 11/1985 | Derderian et al. . |
| 4,562,651 | 1/1986 | Frederick et al. . |
| 4,616,431 | 10/1986 | Dassler . |
| 4,619,055 | 10/1986 | Davidson . |
| 4,624,061 | 11/1986 | Wezel et al. . |
| 4,635,384 | 1/1987 | Huh et al. . |
| 4,657,716 | 4/1987 | Schmidt . |
| 4,667,423 | 5/1987 | Autry et al. . |
| 4,670,995 | 6/1987 | Huang . |
| 4,672,754 | 6/1987 | Ehrlich . |
| 4,676,010 | 6/1987 | Cheskin . |
| 4,680,875 | 7/1987 | Danieli . |
| 4,722,131 | 2/1988 | Huang . |
| 4,730,402 | 3/1988 | Norton et al. . |
| 4,741,114 | 5/1988 | Stubblefield . |
| 4,753,021 | 6/1988 | Cohen . |
| 4,759,136 | 7/1988 | Stewart et al. . |
| 4,763,426 | 8/1988 | Polus et al. . |
| 4,768,295 | 9/1988 | Ito . |
| 4,798,009 | 1/1989 | Colonel et al. . |
| 4,815,221 | 3/1989 | Diaz . |
| 4,817,304 | 4/1989 | Parker et al. . |
| 4,823,483 | 4/1989 | Chapnick . |
| 4,831,750 | 5/1989 | Müller . |
| 4,843,741 | 7/1989 | Yung-Mao . |
| 4,845,861 | 7/1989 | Moumdjian . |
| 4,845,863 | 7/1989 | Yung-Mao . |
| 4,856,208 | 8/1989 | Zaccaro . |
| 4,858,343 | 8/1989 | Flemming . |
| 4,876,053 | 10/1989 | Norton et al. . |
| 4,887,369 | 12/1989 | Bailey et al. . |
| 4,899,467 | 2/1990 | Mackey . |
| 4,905,382 | 3/1990 | Lin ............................................. 36/28 |
| 4,912,861 | 4/1990 | Huang . |
| 4,918,841 | 4/1990 | Turner et al. . |
| 4,920,663 | 5/1990 | Flemming . |
| 4,922,630 | 5/1990 | Robinson . |
| 4,922,631 | 5/1990 | Anderié . |
| 4,930,231 | 6/1990 | Liu . |
| 4,931,115 | 6/1990 | Pajunen . |
| 4,934,071 | 6/1990 | Virgini . |
| 4,972,611 | 11/1990 | Swartz et al. . |
| 4,984,320 | 1/1991 | Curley, Jr. et al. . |
| 4,993,173 | 2/1991 | Gardiner . |
| 4,999,931 | 3/1991 | Vermeulen . |
| 5,014,449 | 5/1991 | Richard et al. . |
| 5,035,758 | 7/1991 | Degler et al. . |
| 5,042,174 | 8/1991 | Nichols . |
| 5,042,175 | 8/1991 | Ronen et al. . |
| 5,042,176 | 8/1991 | Rudy . |
| 5,044,096 | 9/1991 | Polegato . |
| 5,046,267 | 9/1991 | Kilgore et al. . |
| 5,048,203 | 9/1991 | Kling . |
| 5,092,060 | 3/1992 | Frachey et al. . |
| 5,097,607 | 3/1992 | Fredericksen . |
| 5,131,174 | 7/1992 | Drew et al. . |
| 5,212,878 | 5/1993 | Burke et al. . |
| 5,224,278 | 7/1993 | Jeon . |
| 5,282,288 | 2/1994 | Henson . |
| 5,343,639 | 9/1994 | Kilgore et al. . |
| 5,381,607 | 1/1995 | Sussmann . |
| 5,435,079 | 7/1995 | Gallegos . |
| 5,461,800 | 10/1995 | Luthi et al. . |
| 5,500,067 | 3/1996 | Jenkner . |
| 5,551,673 | 9/1996 | Furusawa et al. ...................... 267/160 |
| 5,572,804 | 11/1996 | Skaja et al. . |
| 5,642,575 | 7/1997 | Norton et al. ............................... 36/28 |

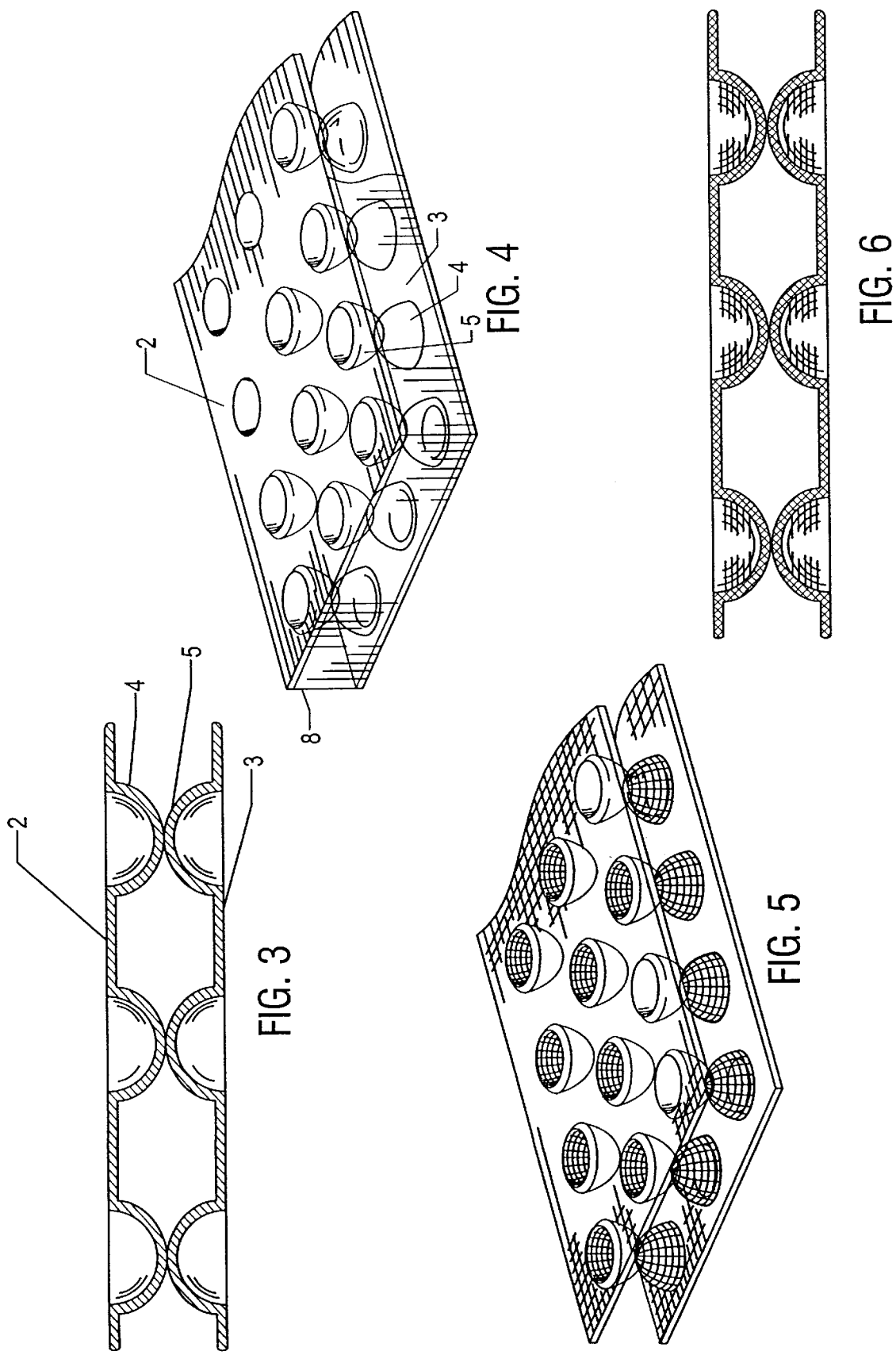

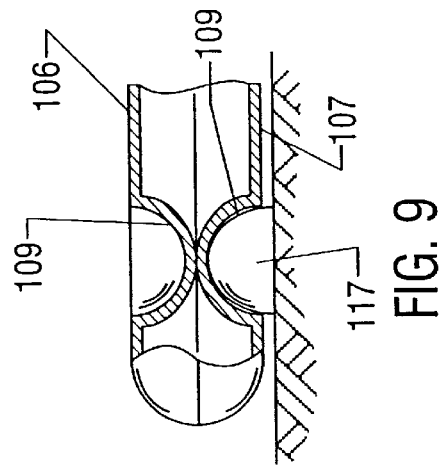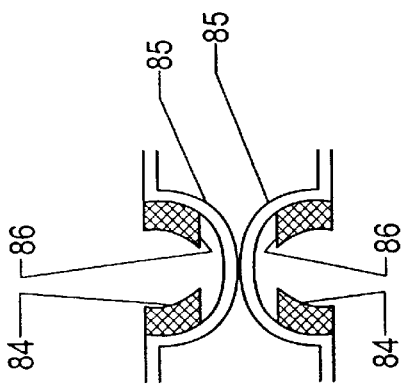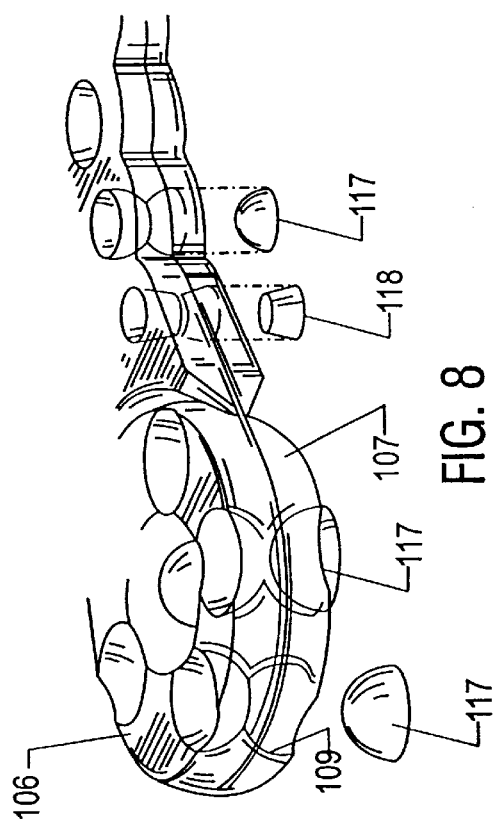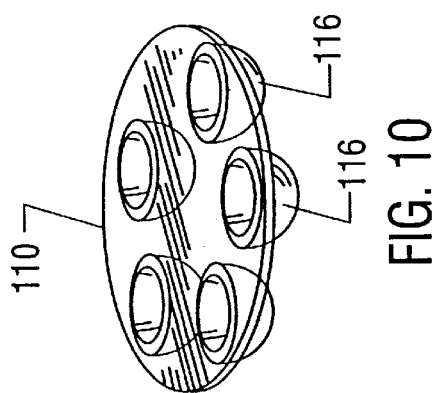

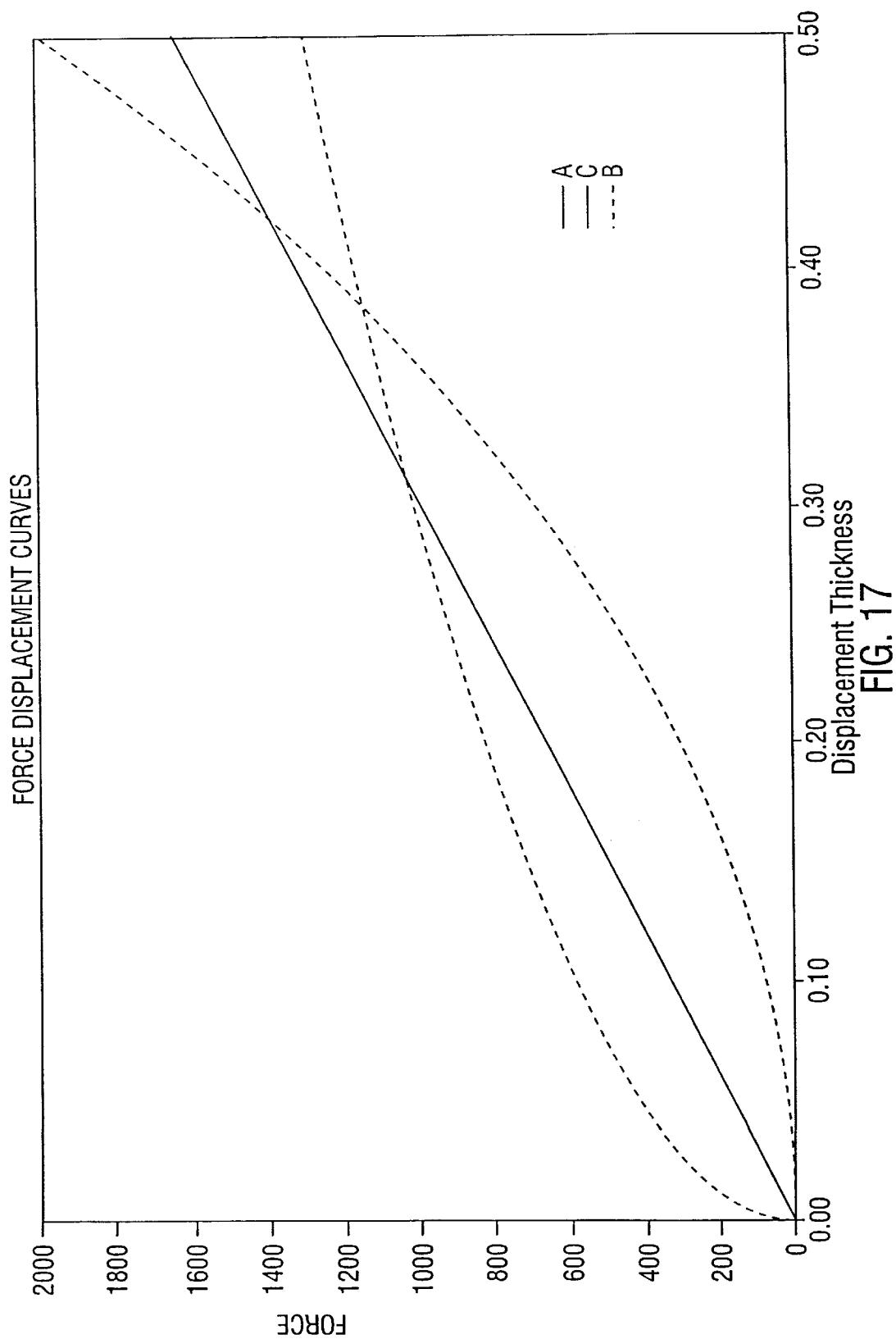

SHOCK ABSORBING COMPONENT AND CONSTRUCTION METHOD

I. BACKGROUND OF THE INVENTION

1. Field of the Invention

The present invention relates to shock absorbing components and to methods of manufacturing shock absorbing components. More particularly, the invention relates to flexible shock absorbing components used for a variety of surfaces, including cushioning for medical purposes, packaging material, athletic protective padding, footwear, exercise equipment padding, seating, industrial safety padding, exercise mats and resilient hard surface covering.

2. Description of Related Art

Efforts to improve shock absorbing materials have centered on decreasing weight and improving cushioning, flexibility, and stability. In particular, shock absorbing materials for footwear and athletic equipment have focused on improved shock dispersion capabilities. Additionally, the modern design of shock absorbing materials takes into account the specific requirements of padding and cushioning for particular activities. Although the functional characteristics of shock absorbing materials are of primary importance, other factors such as cost and appearance must be taken into account for full consumer satisfaction.

Typically, shock absorbing materials for footwear and athletic equipment use plastics expanded into foams which are then shaped in a number of ways to accommodate the application requirements. In certain applications, an outer layer of rubber or other material is added, requiring layering both surfaces with cement where they are to be joined, then activating the treated surfaces, usually with heat. Disadvantages of cementing or adhering sufaces together include cost, weight and appearance.

Shock absorbing components also have been constructed of a shell of a thermoplastic elastomer designed to encapsulate and protect low density synthetic foams such as polyether, polyurethane or polyester polyurethane. Other shock absorbing components typically include an air cushion or bladder which may be filled or inflated with a gas or fluid to a desired pressure. Disadvantages of these types of components include cost and difficulty of sealing the component.

II. SUMMARY OF THE INVENTION

The present invention is a flexible shock absorbing component constructed from a flexible high polymer resin. The shock absorbing component is characterized by two opposing surfaces, hereinafter defined as the top surface and the bottom surface. The component preferably is not inflated or pressurized, but instead has internal support members between the two surfaces. Internal support members for the shock absorbing component are provided by indentations in one or both of the top and bottom surfaces. At least some of the indentations are hemispherical in shape. The hemispherical indentations extend between the top and bottom surfaces and can be spaced apart, or may contact or bridge with the hemispherical indentations extending from the opposite component surface. The support members formed by the hemispherical indentations in the flexible shock absorbing component provide flexible resistance to compressive forces exerted on the component. The shock absorbing component can also include a wall member coextensive with the top and bottom surfaces. The shock absorbing component of the present invention is useful in a variety of applications, and is particularly useful for padding for athletic equipment, footwear, packaging material, cushioning for medical purposes, mats, and other related objects.

The shock absorbing component can be constructed through molding sheets of plastic resin in molds configured to form shapes for incorporation into specific athletic equipment, padding, or packaging. The molds have protrusions to provide the indentations in the material for the support members. One mechanism for forming the shock absorbing component of the present invention is through thermoforming. Generally, thermoforming is a process of shaping plastic resin by heating a sheet or film of the plastic to a temperature at which the resin is sufficiently pliable to be shaped into a desired form and then forcing the material into a one-sided mold. The shock absorbing component of the invention is preferably constructed by (1) heating a first thermoplastic sheet to its forming temperature, (2) heating a second thermoplastic sheet to its forming temperature, (3) forcing the first thermoplastic sheet into a first mold configured to provide an upper component half and forcing the second thermoplastic sheet into a second mold configured to provide a lower component half, and (4) joining together the two molded halves by bonding, gluing, welding, fusing, coupling or the like. The mold halves are configured to indent either or both of the top and bottom surfaces at selected points to provide the internal support members. A particularly preferred construction method is to close together the mold halves while the material is at its forming temperature such that a plurality of the indentations in the shock absorbing component halves are fused or welded together at their contact points.

Alternatively, the shock absorbing component can be constructed by blow molding. Blow molding is a process for the production of hollow thermoplastic shapes. The process is divided into two general categories: extrusion blow molding and injection blow molding. Extrusion blow molding is preferred for the construction of the shock absorbing component of the present invention. In extrusion blow molding the shock absorbing structure, a molten plastic tube called a parison, is dropped or lowered from an extruder. Mold halves close around the parison, which is then expanded so that the opposing top and bottom surfaces are forced against the opposing top and bottom cavity walls by the injection of air. In blow molding, the parison is expanded with a gas, normally air, until the plastic contacts the mold where it is held in the shape of the mold cavity as it is cooled. Like the twin sheet thermoforming process, the mold halves have protrusions which are configured to indent the opposing surfaces of the parison at selected points to provide internal support members.

The support members are inwardly directed indentations that can be configured into a variety of shapes and sizes to provide specific areas of differing degrees of flexibility for stability and cushioning. Preferably, the inwardly directed indentations take the shape of hemispheres which extend inwardly into the cavity from the opposing surfaces of the shock absorbing structure. As the terms hemisphere and hemispherical are used in this application, and as will be apparent to those skilled in the art, this invention includes within its scope indentations having a generally hemispherical shape. For example, indentations having a hemiellipsoidal shape are considered within the scope of this invention, as well as other slight variations to a true hemispherical shape. The hemispheres can be grouped closer together where greater resistance is required for areas where greatest pressure is exerted when the shock absorbing component is used. Or the hemispheres can be increased in size in weight bearing areas to increase cushioning. The indentations in the top surface may be spaced from or in contact with corresponding indentations in the bottom surface. The corresponding indentations can be fused or welded together during the thermoforming process to provide an internal support member combination bridging the top and bottom surfaces of the shock absorbing component.

One advantage of forming the shock absorbing component from two sheets of thermoplastic resin is that it allows the component to be constructed of two different materials having different properties to create a variety of functional responses difficult to achieve through the use of only one material. For example, the bottom surface can be constructed of a thermoplastic which is thicker, and accordingly stiffer, while the top surface is constructed of a thermoplastic which is thinner and more flexible. In addition, indentations extending from the top and bottom surfaces made of different materials can provide support members having dual properties. For example, the lower portion of the support member provided from the stiffer thermoplastic material will provide a stiffer support member portion and thus will provide greater resistance to forces exerted on the bottom portion of the shock absorbing component. The upper portion of the support member constructed from the indentation of the thinner, more flexible material will exhibit greater flexibility, and accordingly provide more cushioning in response to pressures exerted on the top surface of the shock absorbing component. By varying the shapes and sizes of the support members and the properties of the thermoplastic materials employed, the designer can control cushioning characteristics throughout the shock absorbing component.

The shock absorbing component of the present invention also may be constructed of sheets of thermoplastic material having a mesh pattern, or having holes or slits in the material. This construction offers the advantages of decreased weight, and allows transmission of mediums through the surfaces. The indentations in the shock absorbing component also may have perforations therein, or may be formed of a mesh material, which may decrease the average stiffness of the indentation. Other means for varying the stiffness of the shock absorbing structure include molding grooves in the outer walls of inserts which then fit into the indentations. Alternatively, the indentations and/or inserts may have non-uniform wall thickness, so that the structure has stiffness that varies with respect to the displacement.

III. BRIEF DESCRIPTION OF THE DRAWINGS

FIG. 3 is a cross section view of the top and bottom surfaces according to a preferred embodiment with the hemispherical indentations in the top surface abutting those in the bottom surface.

FIG. 4 is a perspective view of the top and bottom surfaces with a wall member along the periphery of the surfaces.

FIG. 5 is a perspective view of the top and bottom surfaces according to a preferred embodiment where the surfaces are made of mesh material.

FIG. 6 is a cross sectional view of the top and bottom surfaces shown in FIG. 5.

FIG. 8 is a perspective view of a shock-absorbing component according to a preferred embodiment having inserts to be placed in one or more indentations in one of the surfaces of the shock absorbing component.

FIG. 9 is a cross section view of a hemisphere-shaped insert in an indentation according to a preferred embodiment.

FIG. 10 is a perspective view of a plurality of inserts joined together by a web structure.

FIG. 16 is a partial cross section view of a pair of opposing indentations and inserts according to another embodiment of the invention.

FIG. 17 is a graph of representative force displacement curves for the shock absorbing structure of the present invention.

IV. DETAILED DESCRIPTION AND PREFERRED EMBODIMENTS

Figure 1:
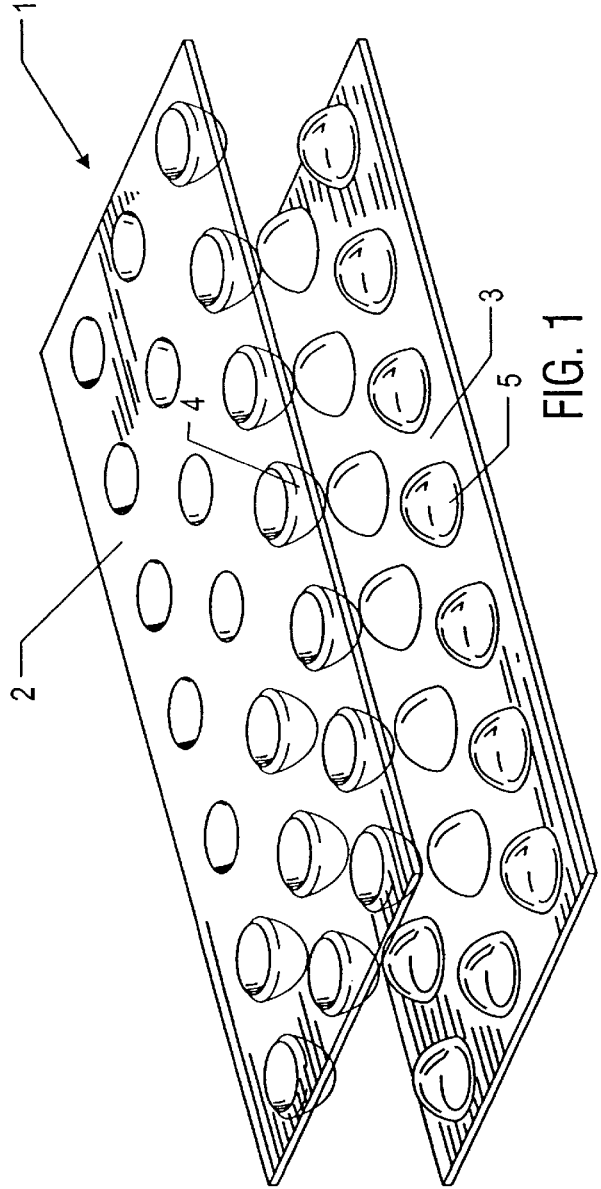
FIG. 1 is a perspective view of the top surface and bottom surface of a shock absorbing component according to a preferred embodiment of the invention.

The present invention is a shock absorbing component made of a flexible high polymer plastic resin. Depending on how the component is used, the component's general shape is configured for incorporation into other equipment. For example, the shock absorbing component can form a portion of a cushion or pad in conjunction with other materials such as traditional ethylene-vinyl acetate copolymer (EVA) foam or other materials.

The shock absorbing component generally consists of one or more high polymers, generally synthetic, which can be molded or formed by heat and pressure. Preferably, the high polymers are thermoplastic polymers or thermoplastic polymers which can be made into thermoset polymers following molding. The polymer is formed into a body member configured for use as a shock absorbing component. Regardless of the specific role of the shock absorbing component, the body member generally comprises opposing surfaces, referred to as a top surface and an opposing bottom surface. The bottom surface is in at least partially coextensive relation to the top surface. The coextensive relation between the top and bottom surfaces defines corresponding portions between the top and bottom surfaces. Preferably, the top and bottom surfaces are disposed in at least partially spaced relation to each other. The top and bottom surfaces may be in a generally parallel planar relationship or the surfaces can taper towards each other and eventually meet. If the opposing surfaces are at least in partially spaced relation to one another, the spaced relation defines an interval or cavity between the surfaces.

Disposed between the top and bottom surfaces are a plurality of support members. The support members are comprised of inwardly directed indentations in one or both of the top and bottom surfaces. The indentations in one surface extend to a point adjacent a corresponding indentation in the opposite surface. Adjacent as used in describing the present invention means that the indentation extends to a point which is at least proximate the corresponding portion of the opposing surface and can be engaged with the opposite indentation. The engagement can be fixed or non-fixed. In one embodiment of the present invention, one or more of the support members are fixedly engaged or are joined to the corresponding portion of the opposite support member to retain the top and bottom surfaces in their coextensive and spaced relation. In another embodiment of the present invention, the indentations in the top surface can be spaced from indentations in the bottom surface but may abut upon application of force to the shock absorbing component.

In another embodiment of the present invention, the body member further comprises a wall member which is coextensive with at least a portion of the periphery of the top and bottom surfaces. In this embodiment, the wall member can join the top and bottom surfaces to retain the surfaces in their spaced and coextensive relation. Moreover, where the wall member is continuous along the periphery of the top and bottom surfaces, it defines a shell having internal support members formed from inwardly directed indentations extending into the shell interior.

As indicated, the support members are integral portions of the shock absorbing component comprising inwardly directed indentations in the polymer materials forming the top and bottom surfaces of the shock absorbing component. The support members provide a controlled collapsing of the material to create areas of cushioning and stability in the component. The support members are configured to extend into the interval between the top and bottom surfaces and adjacent the opposing corresponding portion. The indentations can be formed in one or both of the top and bottom surfaces. The corresponding indentations in the top and bottom surfaces are at least proximate to one another and can be engaged with one another in a fixed or non-fixed relation. The indented portion of the top or bottom members can be to any extent which retains enough of the top and bottom surfaces' non-indented surface area to provide adequate support for use as a shock absorbing component. For example, components having an indented portion of about 50% are contemplated.

Referring to FIG. 1, in a preferred embodiment the shock absorbing component 1 comprises top surface 2 and a bottom surface 3. The top and bottom surfaces are in generally parallel planar relation to each other, or may taper towards each other until a location where the top and bottom surfaces meet. The top and bottom surfaces are in coextensive relation and are partially spaced apart from one another to define an interval or cavity between the top and bottom surfaces. A plurality of inwardly directed hemispherical indentations 4, 5 in the top and bottom surfaces extend toward the opposite surface to provide internal support to the shock absorbing component structure.

Figure 2:
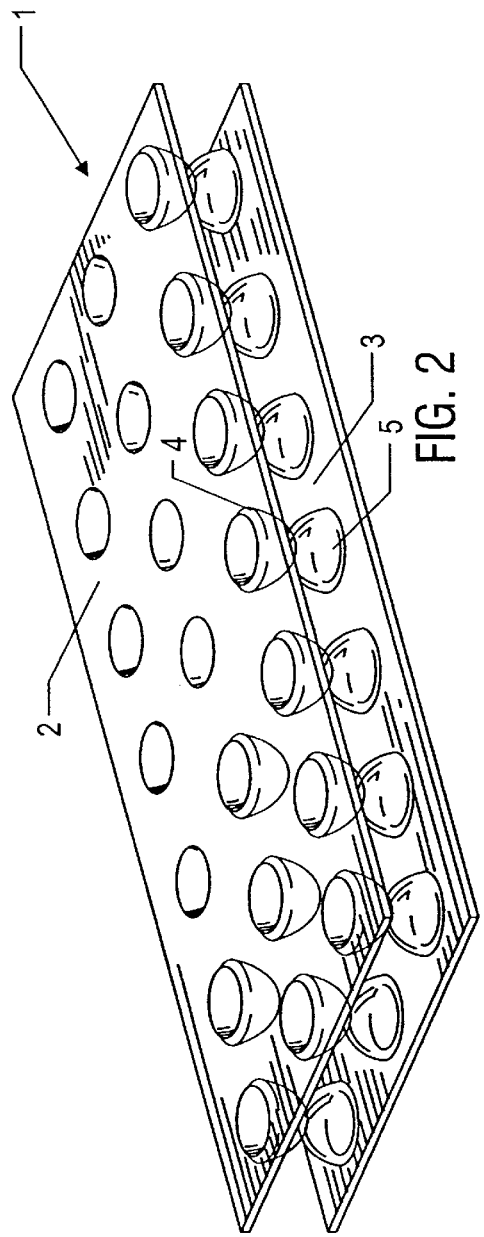
FIG. 2 is a perspective view of the top and bottom surfaces shown in FIG. 1., with the hemispherical indentations in the top surface abutting the hemispherical indentations in the bottom surface.

FIGS. 2 and 3 show the inwardly extending indentations abutting in the top and bottom sheets. As illustrated, the indentations can take a variety of shapes for forming internal support members. In a preferred embodiment each of the indentations has a hemispherical shape, which extends into the interval between the top and bottom surfaces.

As illustrated, support members can cooperate by the contact between corresponding indentations in the upper and lower shock absorbing component halves. FIGS. 2 and 3 illustrate a contact point between opposing indentations to form cooperating support members in accordance with one embodiment of the present invention when the upper and lower shock absorbing component halves are joined. Upper hemispherical-shaped indentation 4 formed in the upper shock absorbing component half 2 is contacted with a corresponding hemispherical-shaped indentation 5 in the lower shock absorbing component half 3. The point of contact can be fixed or non-fixed. If fixed, the indentations can be joined at their contact point such as by gluing, fusing, welding or the like.

In some instances the inwardly directed indentations touch or rest against the opposing shock absorbing component member or corresponding indentations in the opposing surface, but are not attached or joined to the corresponding indentations in the opposing surface. In some instances the design might indicate that indentations not engage the opposite surface until a sufficient amount of pressure is applied on the top or bottom shock absorbing component surface to cause contact between the indentation and the corresponding opposite indentation.

Taking into account the general physical properties of the thermoplastic materials employed, the size, type and grouping of support members are determined by the functional requirements of the intended shock absorbing structure. Accordingly, materials, support members, and location of support members are selected to provide more cushioning and stability in certain areas of the shock absorbing structure. Similarly, areas of the shock absorbing structure requiring more rigidity employ materials, support members, and support member locations which provide increased stiffness or rigidity. For example, indentations in the top and bottom surfaces can be grouped closer together where pressures would be expected to be greatest and consequently more resistance is required. Lateral stability can be enhanced by the addition of walls extending along the periphery of the top and bottom surfaces.

As stated, the polymers selected for constructing the present invention must be flexible enough to function as a shock absorbing component for various uses. Generally, flexible means the shaped polymer component will bend or give in response to an applied force without cracking or breaking in its hardened state. Particularly preferred polymers for use in the present invention are elastomers which have high elongation. In general, the greater the elongation the greater the flex life and resilience of the shock absorbing component. Good elongation properties are also desirable to create an adequate range of cushioning in the shock absorbing structure. For example, polymers with an elongation at break of about 250% to about 300% or more as measured according to ASTM D 638 are representative of desirable polymers for use in the present invention. Preferably, the shock absorbing component will have a flex life of about at least 50,000 flexes. An indicator of such desirable flex life can be determined, for example, by the use of flexing machines such as Ross Flex Equipment and the Satra/Bata belt flexing machine manufactured by Satra Footwear Technology Centre, Kettering, Northhamptonshire, England.

In addition, the hardness of the material is important to desirable shock absorbing component characteristics such as integrity, lateral stability, etc. Harder materials permit the use of thinner materials for constructing the shock absorbing component and thus decrease the weight of the component. Generally, preferred polymers will have a hardness ranging from about 70 on the Shore A scale up to about 55 on the Shore D scale (ASTM D 2240). Other preferred characteristics of the shock absorbing component material are: (1) formability, i.e., the ability of the material to be molded into the desired component shape, (2) abrasion resistance, (3) clarity, (4) good tear strength, (5) low density, (6) good tensile strength, (7) the ability to integrate the material into existing manufacturing methodology, (8) the ability to color the material, and (9) cost. High tensile strength is desired for coping with high shear forces encountered during high activity use. In addition, high tensile strength permits the sole to be molded thinner. Clarity is important in achieving sharp color contrast, which is vital to acceptable decoration in certain applications. Transparency is another consideration where the cosmetic design of the shock absorbing structure includes a transparent portion. Integration into existing manufacturing processes includes such factors as ease of cementing the component to other materials. Traction and wet traction also are key material properties for the shock absorbing component of the present invention.

As indicated, the shock absorbing component is preferably constructed of a thermoplastic resin. Preferable materials are those which are easily thermoformable into desired flexible component configurations. Materials which can be thermoset after molding and retain the flexible characteristics for the shock absorbing component of the present invention are included within the scope of preferred thermoformable materials. Thermoset resins solidify or set irreversibly when heated due to crosslinking between the polymer chains. Crosslinking can be achieved by using nucleating agents, mold temperatures above the materials forming temperature, radiation, etc. A thermoset resin once set or cured cannot be softened again by heating. Thermoset resins are generally characterized by high thermal stability, high dimensional stability and high rigidity and hardness and include resins such as polyesters and urethanes.

Thermoplastic resins can be either crystalline or amorphous and can be repeatedly softened by heating. Amorphous thermoplastics include acrylonitrile-butadiene-styrene (ABS) copolymer, styrene, cellulosics and polycarbonates. Crystalline thermoplastics include nylons, polyethylene, polypropylene and polyurethane. Examples of particularly preferred materials for use in the present invention include thermoplastic polyurethanes, nylons, polyesters, polyethylenes, polyamides and the like.

The following descriptions further illustrate the types of desirable materials for use in the present invention. Thermoplastic polyurethanes exhibit good flex life, especially at higher hardnesses, good abrasion resistance, cementing ease, good elongation and clarity. Examples of particularly preferred thermoplastic polyurethane's are the Elastollan® 1100 series of polymers manufactured by BASF Corp., Parsippany, N.J. Properties of representative Elastollan® polymers are provided in the table below.

| PROPERTY | ASTM | UNITS | GRADES | | |
|---|---|---|---|---|---|
| | | | 1190A | 1154D | 1154D |
| Specific Gravity | D-792 | gr/cc | 1.13 | 1.16 | 1.19 |
| Hardness | D-2240 | Shore D | 42 ± 2 | 53 ± 2 | 73 ± 2 |
| Tensile Strength | D-412 | MPa | 32 | 40 | 40 |
| Elongation @ Break | D-412 | % | 575 | 460 | 350 |
| Abrasion Resistance | D-1044 | mg | 45 | 75 | 75 |

Nylons exhibit good tensile strength and thus can be molded thinner. In addition, they have low density, and are therefore lighter, and exhibit good flex life. An example of a preferred nylon polymer for use in the present invention is Zytel 714 manufactured by E. I. DuPont de Nemours & Co., Wilmington, Del. Representative properties of Zytel 714 are provided in the following table:

| PROPERTY | ASTM | UNITS | ZYTEL 714 |
|---|---|---|---|
| Specific Gravity | D-792 | gr/cc | 1.02 |
| Hardness | D-2240 | Shore D | 55 |
| Tensile Strength | D-638 | MPa | 27.2 |
| Elongation @ Break | D-638 | % | 260 |

Polyesters exhibit good low density, cementing ease, tensile strength and elongation. An example of preferred polyester polymers are various polymers of the Whittler series of thermoplastic elastomers manufactured by E. I. Dupont de Nemours and Company. Hytrel polymers are block copolymers of polybutylene terephthalate and long-hain polyether glycols. Properties of representative examples of Hytrel polymers are provided in the following table:

| PROPERTY | ASTM | UNITS | GRADES | | |
|---|---|---|---|---|---|
| | | | 4056 | 5555HS | G-4774 |
| Specific Gravity | D-792 | gm/cc | 1.16 | 1.16 | 1.20 |
| Hardness | D-2240 | Shore D | 40 | 55 | 47 |
| Tensile Strength | D-638 | MPa | 28 | 40 | 20.7 |
| Elongation @ Break | D-638 | % | 550 | 500 | 275 |

Polyamides exhibit good tear strength, high resilience, low density, good flex life and clarity. An example of a preferred polyamide material is Pebax manufactured by Atochem, Paris, France, which is a polyether block amide thermoplastic elastomer. Properties of representative Pebax polymers are provided in the following table:

| PROPERTY | ASTM | UNITS | GRADES | | |
| --- | --- | --- | --- | --- | --- |
| | | | 533 | 4033 | 3533 |
| Specific Gravity | D-792 | gm/cc | 1.01 | 1.01 | 1.01 |
| Hardness | D-2240 | Shore D | 55 | 40 | 35 |
| Tensile Strength | D-638 | MPa | 44 | 36 | 34 |
| Elongation @ Break | D-638 | % | 455 | 485 | 710 |

Another example of a preferred polymer is Surlyn, manufactured by E. I. DuPont de Nemours and Company. Surlyn is an ironically crosslinked thermoplastic polymer (ionomer) of ethylene and methacrylic acid copolymers which exhibit good tear strength, low density, and good flex life. Properties of Surlyn ionomers are provided in the following table:

| PROPERTY | ASTM | UNITS | GRADES | |
| --- | --- | --- | --- | --- |
| | | | 9020 | 9450 |
| Specific Gravity | D-792 | gm/cc | 0.96 | 0.94 |
| Hardness | D-2240 | Shore D | 55 | 54 |
| Tensile Strength | D-638 | MPa | 26.2 | 21.4 |
| Elongation @ Break | D-638 | % | 510 | 500 |

As stated, the description of properties of specific polymers is for the purpose of illustrating the types of polymers having desirable properties for use in the shock absorbing components of the present invention. Many other polymers with similar properties are suitable for use in the present invention. Moreover, the data provided is based on available information and cannot be used for direct comparisons among polymers or for guiding precise design specifications. For example, ASTM testing permits alternative methods for developing property data. In addition, other ingredients added to polymers, such as fillers, reinforcing agents, colorants, etc., can cause variations in properties.

A preferred method of constructing the shock absorbing component of the present invention is to mold sheets of a flexible high polymer plastic resin to form upper and lower component surfaces and then joining the surfaces to complete the shock absorbing component. Preferred materials, as stated, are sheets of flexible thermoplastic resins which can be heated and molded into desired shock absorbing component shapes. An example of a particularly preferred thermoplastic sheet material is 94 Shore A thermoplastic polyurethane sheet such as is available from Argotec, Inc., Greenfield, Mass. Sheets are generally about 0.010 inches thick. The thickness of the sheet is selected according to design criteria, but will generally range from about 0.040 to about 0.100 inches depending on the particular material properties. For example, particularly preferred thickness for 94 Shore A thermoplastic polyurethane ranges from about 0.060 inches to about 0.080 inches.

In one embodiment of the present invention, a sheet of a first flexible thermoformable material is heated to its forming temperature and then molded in a corresponding first mold configured to form from the material an upper shock absorbing component surface. A sheet of a second flexible thermoformable material is heated to its forming temperature and molded in a corresponding second mold configured to form from the material a lower component surface. The molds are further configured to provide indentations in one or both of the top and bottom surfaces formed from corresponding protrusions in one or both of the molds. Once molded, the upper and lower shock absorbing component surfaces are cooled sufficiently for removal from the mold and are then joined together.

One advantage of twin sheet thermoforming of the shock absorbing structure is the ability to use two different materials having different properties to create a variety of functional values not possible with one material. For example, the shock absorbing component can be constructed of materials having different thickness. Moreover, the indentations used to create the shock absorbing function can all be connected during the molding process. This is highly advantageous when constructing a shock absorbing component having adequate cushioning and stability, without adding additional costly operations. For example, a particularly preferred method of constructing the shock absorbing component of the present invention is through the use of specially designed twin-sheet thermoforming molds and techniques.

Thermoforming in general is a process of shaping thermoplastic resin by heating a sheet or film of plastic resin to a temperature sufficient to make the resin pliable enough to be shaped into a desired form. Generally, the material is heated uniformly throughout to its normal forming temperature. The normal forming temperature is determined by heating the material to the highest temperature at which it still has enough hot strength to be handled, yet is below the degrading temperature of the material. Preferably, the material will have a hot tensile strength adequate to allow the material to stretch uniformly onto and around the mold. The material at its forming temperature is then clamped at its edges and forced into a one-sided mold, typically a temperature-controlled aluminum mold, by applying a vacuum to the mold side of the material to force the material into the mold. Positive air pressure is also typically applied to the material surface opposite the mold side of the material to assist in forcing the material firmly into the mold. When the sheet material is at its forming temperature, the material is essentially annealed (stress-relieved). To avoid forming in stress, the hot sheet should be forced against the mold as rapidly as possible by application of the vacuum and air pressure. Once molded, the part is cooled to its set temperature which is the temperature at which the part hardens sufficiently to permit removal of the part from the mold without deforming the molded part. The molded part is then trimmed of excess material, which is generally present at the edges of the molded article where it has been clamped. The excess material can be recycled if desired.

Twin-sheet thermoforming in particular uses two sheets of material heated to their forming temperatures, the upper sheet forced up into an upper mold half and a lower sheet forced down into a corresponding lower mold half. The two mold halves are pressed together and the pressure of the two molds squeezing the sheets together at their forming temperature effectively welds the two materials together at their points of contact. The points of contact can be along the periphery of the upper and lower shock absorbing component halves and between indentations and corresponding portions of the opposite member. In addition, points of contact can be between corresponding indentations. As indicated, air pressure can be applied between the sheets to assist in forcing the material firmly into the molds. Particularly preferred materials for twin-sheet thermoforming should exhibit good specific heat, i.e., the hot sheet retains its temperature for a sufficient time in the process to easily join surfaces at their contact points. Thermoplastic polyurethane, for example, exhibits good specific heat.

Figure 7:
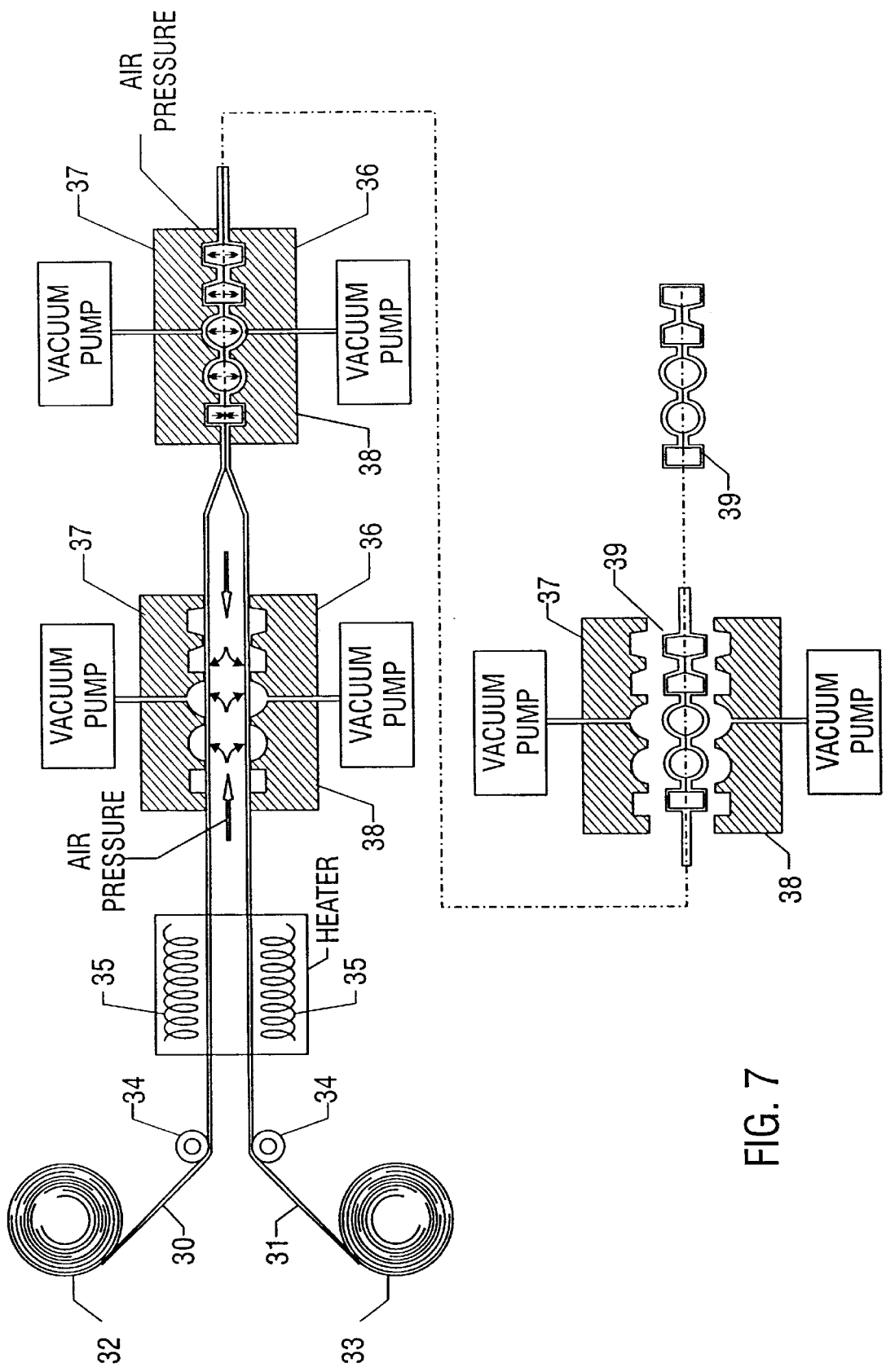
FIG. 7 is a schematic illustrating a twin-sheet thermoforming process.

The present invention's process of thermoforming the shock absorbing component is illustrated generally by reference to FIG. 7. Referring to FIG. 7, two rolls of thermoplastic sheet stock 30 and 31 are fed from rolls 32 and 33 over rollers 34 to sheet stock heaters 35 to raise the temperature of the sheet stock to substantially its normal forming temperature. The sheet stock is then advanced to the form station 36 having an upper component mold 37 and a lower component mold 38. Alternatively, separate sheets of thermoplastic may be used instead of continuous rolls of thermoplastic sheet stock. The sheets move from station to station (i.e., from heating to molding) in such a process. The mold halves are closed together and the vacuum is applied to the mold halves to force the upper sheet material into the upper mold 37, and the lower sheet material into the corresponding lower mold 38. Air pressure can also be applied between the sheets to assist in forcing the materials firmly into the molds. The mold halves remain closed together for a time sufficient to weld the upper and lower materials together at their points of contact. For 94 Shore A thermoplastic polyurethane of 0.060 to 0.080 inches thick, for example, the sheets are molded at about 400 F. and a cycle time of about 20 seconds. The mold halves are then retracted and the formed shock absorbing component 39 is removed from the mold after sufficient cooling and advanced further down the line for trimming.

In construction of the shock absorbing structure of the present invention, it has been found that pressurizing the cavity between the two mold halves is useful to prevent the opposing surfaces from collapsing together and forming extra unnecessary welds. It is preferred to pressurize the space between the two molds during the de-mold operation to prevent such collapsing and unwanted welding. Additionally, pressurizing this space between the mold halves helps urge the opposing surfaces against the mold halves so that each sheet conforms to the mold surface accurately and completely, and helps bond the indentations in the surface(s) against any inserts that may be positioned in the molds.

As described, the upper and lower shock absorbing component surfaces can be constructed of different thermoplastic materials. Accordingly, a number of advantages can be engineered into the component. For example, the top surface can be composed of a thicker, heavier thermoplastic material, while the bottom surface is composed of a thinner, lighter thermoplastic material. Similarly, having corresponding support members of two different materials increases the ability of the designer to construct differing degrees of flexibility or resistance into specific areas of the shock absorbing component. By varying the materials employed in terms of specific properties such as tensile strength, material thickness and elongation and by varying indentation configurations to form support members, a number of consistently reproducible regions of desired resistance and flexibility can be engineered into the shock absorbing component to meet specific requirements. For example, a thicker, more rigid material can be employed as the top surface and a thinner, more flexible material can be employed as the bottom surface. The indentation extending from the top surface from a stiffer material would form a more rigid upper portion. The indentation extending from the bottom surface would provide a more flexible, "softer" lower support member. Consequently, cooperating support members are provided having dual characteristics enabling the functional response of the support members to be more precisely engineered. In addition, where the component includes a wall member, the wall member can be formed from two materials, i.e., the wall can be split between the upper and lower shock absorbing component surfaces.

Alternatively, the shock absorbing component can be constructed by blow molding, and preferably extrusion blow molding. In extrusion blow molding, a parison (or round hollow tube) of molten thermoplastic resin is first extruded, then entrapped between the two halves of the mold. The parison is expanded against the cavity of the mold with air pressure to form the opposing surfaces of the shock absorbing structure. After the parison is molded to provide indentations in the opposing surfaces, the structure is cooled and removed from the mold.

In the preferred embodiment, one or more of the inwardly directed indentations in the opposing surfaces have a hemispherical shape. As shown in FIG. 4, top member 2 is joined to bottom member 3 and preferably the members are joined with a wall member 8 at their outer periphery. Extending into the interval between the top and bottom members are a plurality of inwardly directed indentations 4,5 to provided internal support to the shock absorbing component structure. As indicated above, one or more of the indentations are hemisphere-shaped. In the preferred embodiment, the diameter of each hemisphere-shaped indentation may be anywhere from approximately ⅛ to ½. The hemisphere-shaped indentations in the top and bottom members may be abutting and/or may be joined together using adhesive or other means.

The hemisphere-shaped indentations in the top and bottom members preferably are formed from sheets of flexible high polymer plastic resin which can be heated and molded into these components. Alternatively, the hemisphere-shaped indentations may be formed by blow molding a thermoplastic resin. The hemisphere-shaped indentations are integral portions of each shock absorbing component to provide a controlled collapsing of the material and thereby create areas of cushioning and stability as desired.

A significant advantage of the hemisphere shape for the indentations in the shock absorbing structure is improved fatigue resistance over the life of the structure. The hemisphere has better resistance to cracking when subject to compression than other shaped indentations. Other advantages of hemisphere-shaped indentations include better performance across the entire force deformation cycle, reduction in stress and strain in the material used for the top and bottom portions, and ease in molding. As used in this application, the term hemisphere includes generally hemispherical shapes and is not limited to those having the precise dimensions of a hemisphere, but also includes hemiellipsoidal shapes.

The hemisphere shape has the advantage of a smooth load definition curve, increasing the perceived performance of the shock absorbing system. Additionally, the hemispherical shape minimizes the induced stresses and strains in the material from which the indentation is made. Consequently, indentations using the design of the hemisphere are more durable than cushioning members of other designs made from the same material. The stress distribution of hemisphere-shaped indentations enhances the life of the shock absorbing structure and controls cushioning and comfort, without the need to insert foam or other filler between the top and bottom surfaces, or to inject air or some other gas or fluid into the interval between the top and bottom surfaces. The hemisphere-shaped indentations may be combined with other indentations in the top and bottom surfaces to provide cushioning characteristics as needed for different activities.

In a preferred embodiment, at least one passageway extends through one or both surfaces of the shock absorbing structure, which provides a path for air or other mediums to communicate between the inside and outside of the structure. Thus, the internal cavity between the top and bottom shock absorbing components preferably does not entrap air, or any other gas or fluid, but allows it to escape the interval during compression so as to not interfere with cushioning. Additional air passageways may be used in both the top and bottom surfaces as desired to provide additional air flow.

As shown in FIGS. 8 and 9, one or more indentations 109 in either the top surface 106 or the bottom surface 107 may be adapted to receive inserts 117, 118 therein. For example, each of the inserts may be a hemisphere-shaped rubber plug 117 that fits into each of the hemisphere-shaped indentations. Preferably, the hemisphere-shaped rubber plug is hollow. The inserts may be used to adjust the cushioning characteristics of the shock absorbing component.

Alternatively, the hemispherical shaped inserts 116 may be attached together using the web-like structure 110 shown in FIG. 10. The web-like structure provides a trampoline-like effect. The web-like structure may be formed of the same plastic of the top or bottom members, or a material softer than the members if desired.

Preferably, each of inserts 117, 118 preferably is made of rubber such as SBR rubber and may have hardness anywhere from approximately 35 to 95 on the Shore A scale. In a preferred embodiment the inserts are hollow rubber plugs. Preferably, each insert has a hollow cavity therein. However, the inserts may be solid rubber plugs or, if desired, may have other internal structure for specific applications. The inserts may be shaped to fit into various different indentations in the sole structure including hemispherical, conical, or other shaped indentations. The inserts may be attached to each indentation by adhesive. Or, as discussed above, during thermoforming of the shock absorbing structure, the inserts may be attached to each indentation.

In a preferred embodiment, the inserts are attached to indentations in the top and bottom surfaces using the following method. First, the insert is conditioned by sandblasting or other techniques to prepare the outer surface of the rubber. Then, a primer and an adhesive are applied to the rubber surface which will be in contact with the indentation. Preferably, the primer is a chlorine based primer and the adhesive is a urethane based heat-activated adhesive. Next, the insert is placed in a mold having cut-out areas configured for the shape of the insert. The twin sheets of thermoplastic are heated to a desired temperature (preferably from 350 to 400 degrees) and enter the top and bottom molds, as shown in FIG. 7. Preferably, each insert has an air passage therethrough and, as discussed earlier in the specification, the mold also includes air passages therethrough which, when the insert is placed in the mold, is aligned to the air passage through the insert. Negative or vacuum pressure is applied through the aligned air passages in the mold and insert, to urge the heated thermoplastic against the mold to conform the thermoplastic to the shape of the various indentations in the mold and against the inserts positioned in the mold. A needle also may be inserted through one or more air passages in the top or bottom members and positive air pressure is provided between the mold halves to urge the indentations in the top or bottom member against the insert which is positioned in the mold. This provides a method of securing the inserts into each of the indentations.

As described above, it has been found that application of negative pressure through aligned passages in the mold and inserts helps to securely attach the inserts to the thermoplastic sheets. Additionally, the use of heat activated adhesives applied on the outer surface of the inserts helps the inserts bond directly to the sheets.

The indentations and inserts can be adapted to make one part of the shock absorbing structure stiffer in compression than the other part. There are a number of different ways to provide this difference in compression. A smaller hemisphere radius may be used for the indentations on one part of the structure. Inserts made of a material with a higher modulus of elasticity may be used in the indentations on one part of the structure. Alternatively, inserts with greater wall thickness may be used for the indentations on one part of the structure.

In an alternative embodiment, as shown in FIGS. 5 and 6, the thermoplastic material used to manufacture the shock absorbing component is made of mesh material or is perforated with holes or slits before or after molding of indentations therein. By using mesh, or holes or slits in the thermoplastic material, mediums may pass through the shock absorbing structure at a controllable rate and/or direction while still affording cushioning or other key functional attributes of the structure. The rate of medium transmission may be controlled by hole size, or the dimensions of the mesh. Also, the weight of the shock absorbing structure may be minimized or decreased below that of a non-mesh structure. The thermoplastic material may have a mesh pattern, holes or slits, prior to molding the indentations, but it also is contemplated that the mesh, holes or slits may be formed in the material after it is indented using the mold.

All or part of the thermoplastic resin used to make the shock absorbing structure may have a mesh pattern, holes or slits. For example, mesh can be located only within a specific area so that mediums may be transmitted through only that part of the shock absorbing structure. Preferably, the mesh pattern, holes or slits will have dimensions such that mediums such as air, gas, water, other fluids or particles may be transmitted therethrough at a controllable rate and/or direction. Also, the mesh pattern, holes or slits may be configured to enable temperature, humidity, and other environmental components to be transmitted therethrough.

The shock absorbing structure of the present invention also may be constructed of transparent material, or of a laminate such as thermoplastic urethane. The thermoplastic resin may have strands of material therein to help prevent sag of the sheets or parison during the molding process. Preferably, the strands are made from nylon or other materials with higher melt points than the sheeting or parison.

Figure 12:
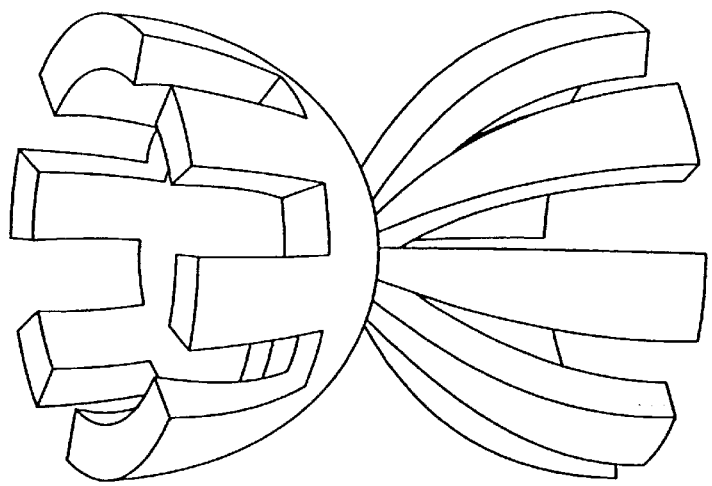
FIG. 12 is a perspective view of a pair of opposing hemispheres having slits therein.
Figure 11:
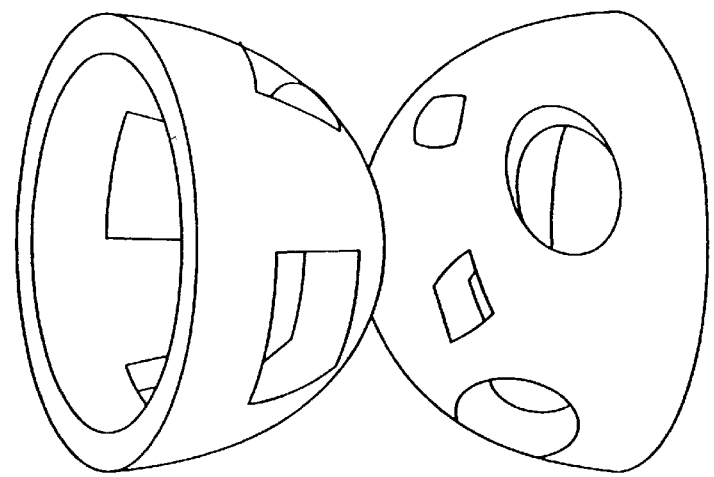
FIG. 11 is a perspective view of a pair of opposing hemispheres having holes or perforations therein.

It also is contemplated that the indentations in the shock absorbing structure may have perforations therein. For example, the hemispherical indentations in a preferred embodiment may include perforations or cuts in the surface of the hemisphere, as shown in FIGS. 11–12. These perforations have the effect of decreasing the average stiffness of the indentation and changing the shape of the force displacement curve. Preferably, each of the structures should retain the hemispherical or hemiellipsoidal shape, and have more solid material than open space therein. In another embodiment, one or more of the hemispherical indentations has a mesh pattern therein. Like the perforations in the hemispheres, the use of mesh helps decrease the average stiffness of the indentation.

In another embodiment, one or more of the inserts may be formed of a mesh material, or have holes or slits therein. The inserts are configured to fit in the indentations in one or both of the opposing surfaces of the shock absorbing structure. By forming the inserts of a mesh material or a material having perforations or cuts in the walls thereof, the stiffness of the shock absorbing structure may be varied.

Figure 13:
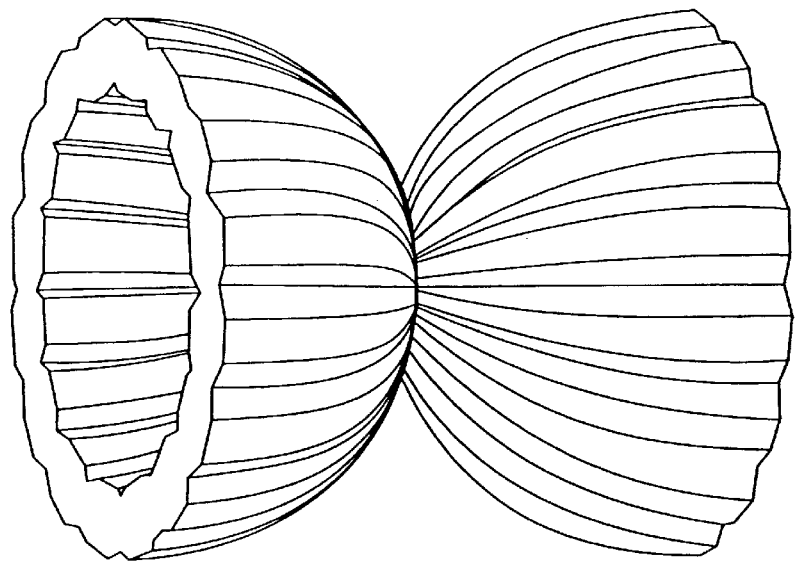
FIG. 13 is a perspective view of a pair of opposing hemispheres having longitudinal grooves in the surfaces thereof.
Figure 14:
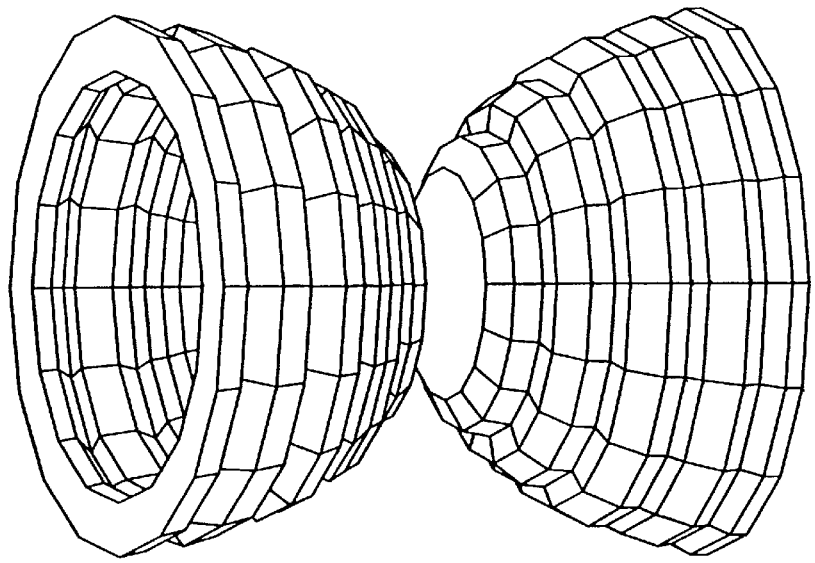
FIG. 14 is a perspective view of a pair of opposing hemispheres having circumferential grooves in the surfaces therof.

In another embodiment of the present invention, as shown in FIGS. 13–14, each insert may have one or more grooves molded into its outer walls. The corresponding indentation also may have one or more grooves molded into its walls during thermoforming. Each groove has the effect of increasing the average stiffness of the shock absorbing structure and changing the shape of the force displacement curve. Each groove may be oriented from the crest of the hemispherical indentation to its base, or circumferentially around the hemisphere. Grooves oriented in other directions, including grooves helically around each hemisphere, or combinations of grooves having different orientations also may be used.

Figure 15B:
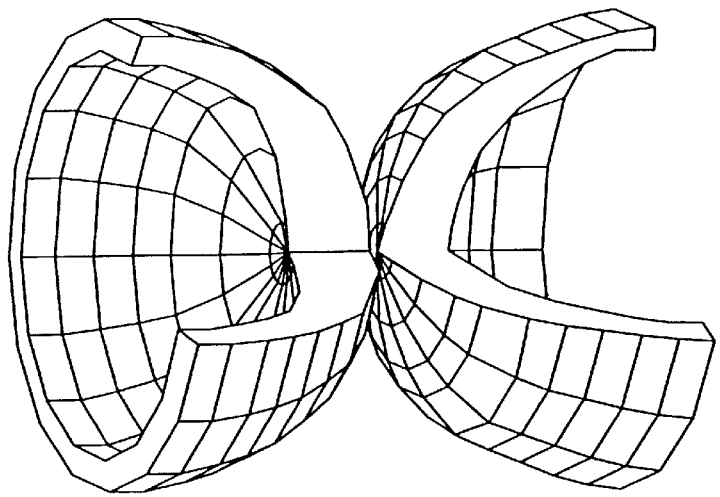
FIG. 15 is a perspective view of a pair of opposing hemispheres having varying thickness.
Figure 15A:
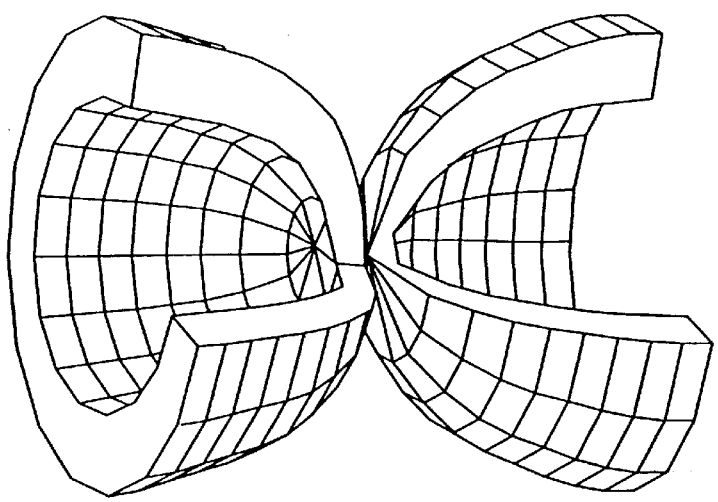

In another embodiment as shown in FIG. 15, the indentations or inserts have non-uniform wall thickness. For example, the base of the hemisphere may have a greater thickness than its crest, or vice versa. The non-uniformities provide the structure with specific non-linear load displacement properties. FIG. 16 shows a pair of hollow inserts 84 that are adhered to hemispherical indentations 85 with the tip or crest 86 of each insert cut off. Or, the tip or crest of each insert may consist of a thin layer of rubber. The inserts of these designs have the advantage of being softer at lower loads and stiffer when greater forces are applied to the shock absorbing structure.

By varying structural elements in the design, it is possible to manipulate the force displacement characteristics of the shock absorbing structure, including controlling the non-linearity of the shock absorbing structure. Non-linearity means that the shock absorbing structure has one stiffness at lower displacements, but a different stiffness at higher displacements, or more generally, that the stiffness is itself a function of displacement. FIG. 17 shows examples of force displacement curves. Curve A is linear relationship described by the linear equation F=kx where k is the slope of the line or "stiffness". Curve B is a non-linear relationship in which the stiffness increases at higher displacements. This is typical of foams and other cushioning materials which "bottom out" when compressed to strains above 0.5 (i.e., beyond 50% of their original thickness). Curve B has the disadvantage that it is an inefficient absorber of impact energy, since most of the energy of impact is absorbed at higher force levels. It has the advantage that the peak rate of loading during an impact is relatively low. Curve C shows a non-linear relationship in which the stiffness decreases as the displacement of the shock absorbing apparatus increases. A shock absorbing structure with a characteristic curve like this has the advantage that the energy of an impact is absorbed at relatively low forces. It has the disadvantage that the peak rate of loading, which occurs at the first moment of impact in this case, is higher.

Figure 18:
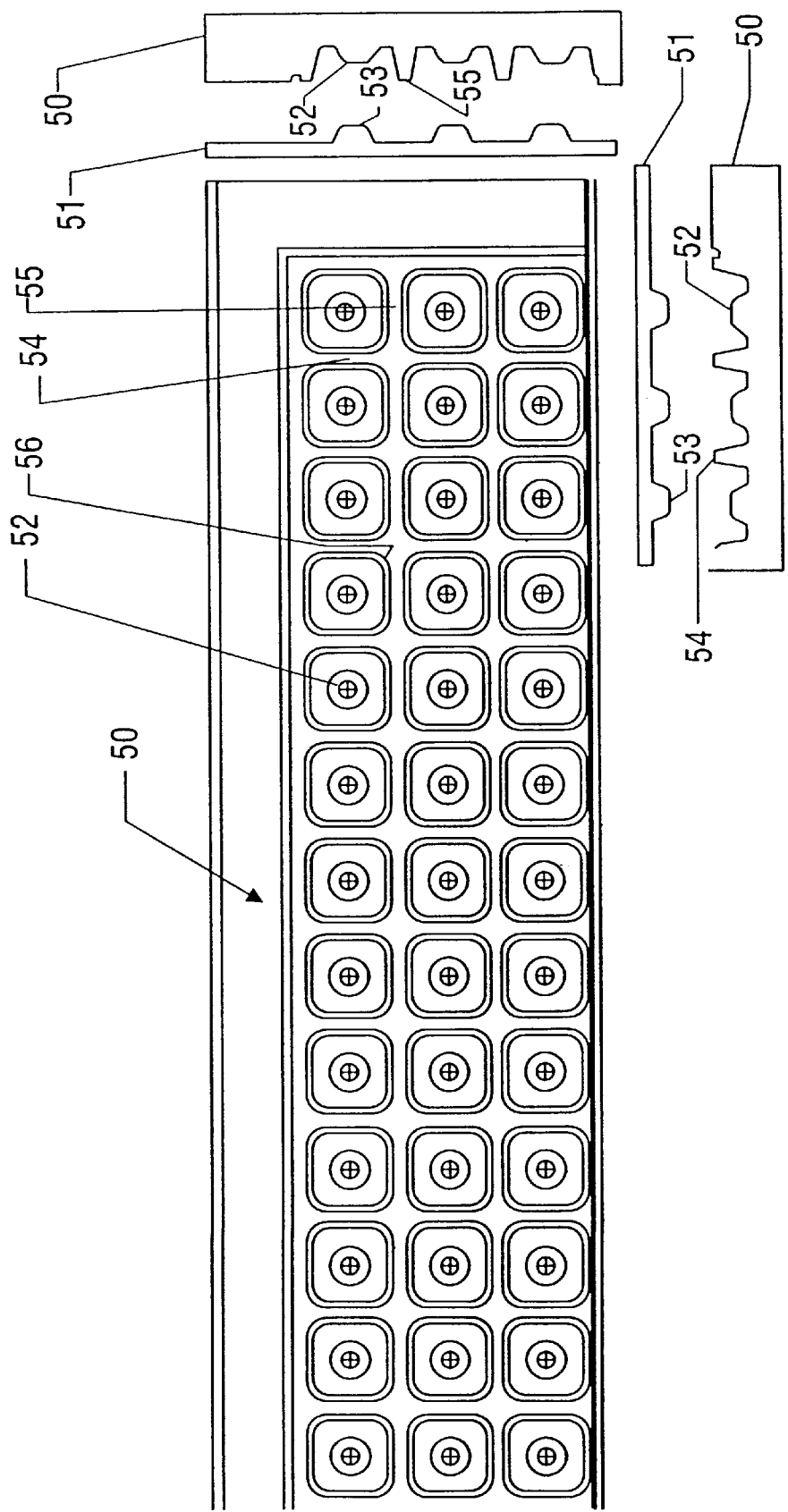
FIG. 18 is a top view of a mold used to form indentations in the bottom surface and an end view in cross section of a pair of molds used to form indentations in both top and bottom surfaces, according to a preferred embodiment of the invention.

FIG. 18 shows a top view of a mold used to form indentations in the bottom surface according to a preferred embodiment of the invention. Lower mold half 50 has a plurality of hemispherical shaped protrusions 52 that are positioned in a series of rows and columns to form indentations in the bottom surface of thermoplastic that is applied thereto. Lower mold half 50 also includes a series of linear protusions 54 along a first axis and linear protrusions 55 along a second axis perpendicular to the first axis. Each intersection 56 between linear protrusions 54 and 55 preferably has rounded corners. Linear protrusions 54, 55 are used to form linear indentations in the surface of thermoplastic which conforms to that mold. Preferably, lower mold half 50 is used to form hemispherical and linear indentations in the bottom surface and upper mold half 51 is used to form hemispherical indentations in the top surface. The linear indentations provide grooves in the bottom surface. The linear indentations, which are inwardly directed so that the crest of each linear indentation faces the opposing surface, preferably have sufficient depth to contact or abut the opposing surface. As shown in the end view in cross section, in a preferred embodiment the linear indentations alternate with hemispherical indentations so that each hemispherical indentation is positioned adjacent a linear indentation. Preferably, the linear indentations are configured to provide a series of intersecting rows and columns which form support members between the two surfaces. The hemispherical indentations 52 in the bottom surface preferably abut hemispherical indentations 53 in the top surface. One advantage of configuring the inwardly directed linear indentations in one or both of the opposing surfaces is that the indentations form flexible grooves that increase flexibility of the shock absorbing structure. In this embodiment, it is preferred that the crest of each linear indentation be in the same plane as the bottom surface. Thus, each hemispherical indentation in the bottom surface is surrounded by a recess positioned between the rows and columns of linear indentations.

Figure 19:
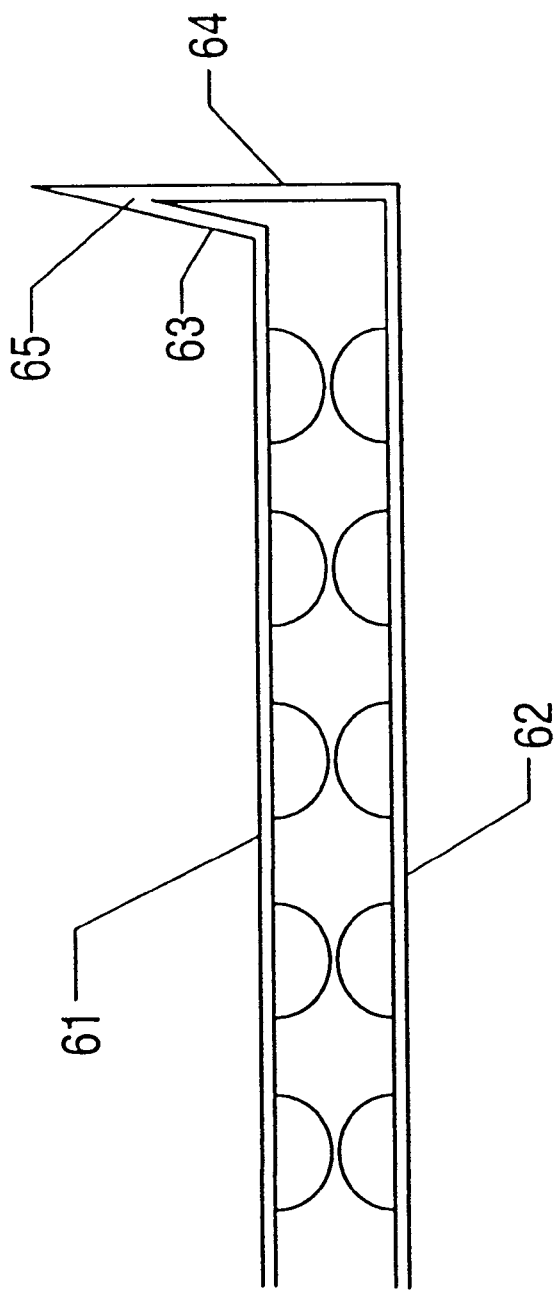
FIG. 19 is an end view in cross section of a pair of surfaces joined together by a vertical sidewall according to a preferred embodiment of the present invention.

FIG. 19 shows an end view in cross section of a preferred embodiment for a vertical sidewall between top sheet 61 and bottom sheet 62. The perimeter 64 of bottom sheet 62 is formed in the mold half so that it is directed vertically upward from the bottom sheet, and the perimeter 63 of top sheet is similarly molded so that it is directed vertically upward, but at a slight angle so that it extends outwardly to contact perimeter 64 of the bottom sheet. Preferably, perimeter 64 of the bottom sheet is dimensioned to be slightly larger than perimeter 63 of the top sheet. The two perimeters abut to form a vertical sidewall 65 connecting the edges of the top and bottom members.

The foregoing description is for the purpose of illustrating the invention. Many other variations will be apparent to those of ordinary skill in the art and all such variations are encompassed within the scope of the present invention.

What is claimed:

1. A shock absorbing component comprising:
   (a) a top surface made of flexible high polymer resin;
   (b) a bottom surface made of flexible high polymer resin, in at least partially coextensive relation to said top surface to define a cavity therebetween, said coextensive relation defining opposing corresponding portions of said top and bottom surfaces;
   (c) a plurality of support members comprising inwardly directed indentations in both of said top and bottom surfaces extending into the cavity, a plurality of the indentations in each of the top and bottom surfaces having a hemispherical shape and an outwardly facing recess, a plurality of the indentations in said top surface abutting said indentations in the bottom surface.

2. The shock absorbing component of claim 1 further comprising a passageway through at least one of the top and bottom surfaces.

3. The shock absorbing component of claim 1 further comprising a wall member coextensive with at least a portion of the periphery of said top and bottom surfaces.

4. The shock absorbing component of claim 1 further comprising at least one groove in the outer surface of at least one of the indentations.

5. The shock absorbing component of claim 1 wherein said top and bottom surfaces are composed of different polymers.

6. The shock absorbing component of claim 1 wherein said top surface has a different thickness than the bottom surface.

7. The shock absorbing component of claim 1 wherein the flexible high polymer resin forming at least one of the top and bottom surfaces comprises a material having a plurality of openings therein sufficient for the transmission of fluids therethrough.

8. The shock absorbing component of claim 1 wherein the indentations in at least one of the top and bottom surfaces have perforations therein.

9. The shock absorbing component of claim 1 wherein at least one of the indentations has a different wall thickness at the crest of the indentation than at the base of the indentation.

10. The shock absorbing component of claim 1 further comprising at least one hemispherical insert adhered to one of the indentations in at least one of the top and bottom surfaces.

11. The shock absorbing component of claim 10 wherein the hemispherical inserts are hollow.

12. The shock absorbing component of claim 11 wherein at least one of the hemispherical inserts has nonuniform wall thickness.

13. A shock absorbing component comprising:
   (a) a flexible high polymer resin top surface;
   (b) a flexible high polymer resin bottom surface in at least partially coextensive relation to said top surface to form a cavity between the top and bottom surfaces, said coextensive relationship defining opposing corresponding portions between said top and bottom surfaces; at least one of the top and bottom surfaces having a plurality of passages therethrough;
   (c) a wall member coextensive with at least a portion of the periphery of said top and bottom surfaces, said wall member joining said top and bottom surfaces; and a plurality of internal support members comprising inwardly directed indentations in one or both of said top and bottom surfaces extending into the cavity, said indentations having a hemispherical shape configured to extend between said top and bottom surfaces and an outwardly facing recess.

14. The shock absorbing component of claim 13 further comprising a plurality of hemispherical shaped inserts, each insert adhered to one of the indentations.

15. The shock absorbing component of claim 14 further comprising a web connecting together at least two of the hemispherical shaped inserts.

16. The shock absorbing component of claim 13 wherein the hemspherical shaped inserts each have at least one passageway extending therethrough.

17. The shock absorbing component of claim 14 wherein at least one of the hemispherical shaped inserts has at least one groove in the outer surface thereof.

18. A shock absorbing structure comprising:
   (a) first and second generally planar thermoplastic surfaces, a cavity between the first and second thermoplastic surfaces, each thermoplastic surface having a plurality of generally hemispherical shaped indentations therein, the crest of each hemispherical indentation in the first thermoplastic surface extending into the cavity and contacting the crest of each hemispherical indentation in the second thermoplastic surface; and
   (b) a plurality of linear indentations in the first thermoplastic surface, the linear indentations extending into the cavity and contacting the second thermoplastic surface.

19. The shock absorbing structure of claim 18 wherein the linear indentations are arranged in a series of rows and columns.

20. The shock absorbing structure of claim 19 wherein each linear indentation in a row intersects a linear indentation in a column, the intersection having rounded corners.

21. The shock absorbing structure of claim 18 wherein each hemispherical indentation is positioned adjacent a linear indentation.

* * * * *